United States Patent [19]
Christensen

[11] 3,955,837
[45] May 11, 1976

[54] LATCH

[76] Inventor: Lars N. Christensen, Viborg, S. Dak. 57070

[22] Filed: Jan. 20, 1975

[21] Appl. No.: 542,619

[52] U.S. Cl. .............................. 292/173; 292/336.3
[51] Int. Cl.² .......................................... E05C 1/06
[58] Field of Search ................. 292/173, 128, 336.3

[56] References Cited
UNITED STATES PATENTS

| 952,715 | 3/1910 | Shonka | 292/128 |
|---|---|---|---|
| 1,173,918 | 2/1916 | Barton | 292/128 |
| 1,654,256 | 12/1927 | Hill et al. | 292/173 |
| 2,746,783 | 5/1956 | Rader | 292/173 |
| 2,759,752 | 8/1956 | Demings | 292/173 X |
| 2,764,440 | 9/1956 | Marko | 292/173 |
| 2,969,999 | 1/1961 | Herman | 292/173 X |
| 3,141,693 | 7/1964 | Fugit | 292/173 |

Primary Examiner—Richard E. Moore
Attorney, Agent, or Firm—Keith B. Davis

[57] ABSTRACT

A latch including a handle operative only in response to a grasp-like pull. In a preferred embodiment, the handle comprises a rod bent into a general C-shape to provide a pair of ends. The handle is pivotally mounted. Operation of the handle pivots a first handle end in an arc to move a latch bolt approximately parallel to the chord of said first handle arc to move the latch bolt from an engagement to a disengagement position. The second end of the handle normally closely abuts the latch casing to preclude operation of the handle by a push.

19 Claims, 6 Drawing Figures

LATCH

BACKGROUND AND FIELD OF THE INVENTION

Briefly, the invention relates to a latch, in general, and in particular to a farm gate latch.

An object of the invention is to provide a farm gate latch ready operation of which by a farm animal is frustrated.

A further object of the invention is a farm gate latch which is readily operable by a person either side of the gate.

Another object of the invention is a farm gate latch for use with a multi-panel farm gate.

An additional object of the invention is a farm gate latch for use with a pipe, multi-panel farm gate.

Yet a further object of the invention is a pull-operated farm gate latch.

Still another object of the invention is a farm gate latch having a planar, pivotable handle, rotation of which is in the plane of the handle and in the direction from which it is opened to provide a pull-operated farm gate latch.

An object of the invention is a farm gate latch having a handle operable by a semi-grasp or full grasp, such as is typically employed by a person.

Another object of the invention is a farm gate latch the handle mechanism of which has a significant mechanical advantage for opening the latch.

BRIEF DESCRIPTION OF INVENTION

The invention comprises a farm gate latch having a handle and a movable member such as a bolt for mating engagement with a catch. The handle has a configuration which requires application of a grasp-like force to operate the handle to open the latch. Such a handle is readily operable by digital animals, such as man, but operated only with great difficulty, if at all, by farm animals such as cattle and horses. Both a handle configuration which has an end which abuts other structure and a handle which has a recessed handle require application of a grasp-like pull force and are unresponsive to push forces, the latter of which forces are readily applied by non-digital farm animals, such as, for example, cattle, horses, pigs and sheep.

In a specific preferred embodiment of the invention, a farm gate latch comprises a pair of elongate handles, a bolt, a casing for housing the bolt, and a bias spring which holds the handles in a normal position, namely with a first end against a strike on the bolt and with the handle second end in abutment against the casing. Each handle is a generally C-shaped rod. The rods are each pivotally secured to a mounting yoke which is attached to the casing. The end of each rod forming the handle first end extends into the casing to operate the bolt. The bolt transmits a force from the bias spring to the handle first end and the force operates through the handle pivot point to hold the handle second end in abutment against the casing.

BRIEF DESCRIPTION OF DRAWING

In FIGS. 2, 3, and 4, the drawings are approximately to scale.

DETAILED DESCRIPTION OF INVENTION

Figure 1:
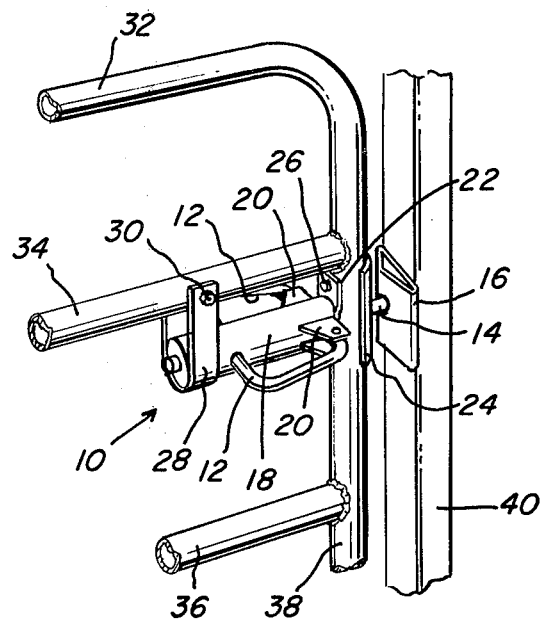
FIG. 1 is a perspective view of a preferred embodiment of a gate latch according to the present invention shown attached to a pipe gate.

A preferred embodiment of the present invention is shown generally as 10 in FIG. 1, a perspective view. Latch 10 comprises a pair of handles 12, although only a single handle is required, and a bolt 14 which is a moveable member for engaging a catch 16. Bolt 14 is housed within a casing 18 and handles 12 are attached to casing 18 by attachment yokes 20. Latch 10 includes vertical member and horizontal member attachment means which for the particular embodiment consist of a flat plate 22, curved plate 24, bolts 26, an elongate strip 28, and another bolt 30. Latch 10 is shown attached to a pipe, multipanel, farm gate having a top horizontal panel 32, first interior horizontal panel 34, second interior panel 36, vertical panel 38, latch post 40, and a bottom horizontal panel (not shown).

Figure 2:
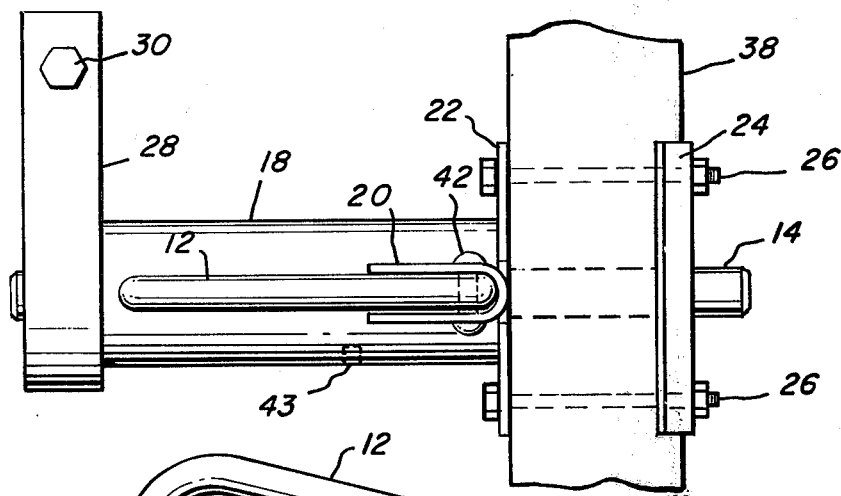
FIG. 2 is a side plan view of a preferred embodiment of a gate latch according to the present invention.

FIG. 2 is a side, plan view of latch 10. Attachment yoke 20 is shown to comprise a generally U-shaped channel to which a handle 12 is pivotally attached by means of a rivet 42 which serves as a pivot pin. An aperture 43 in casing 18 provides for drainage of fluids from the casing. Bolt 14 and bolts 26 each pass through apertures in plate 22, vertical member 38 and plate 24.

Figure 3:
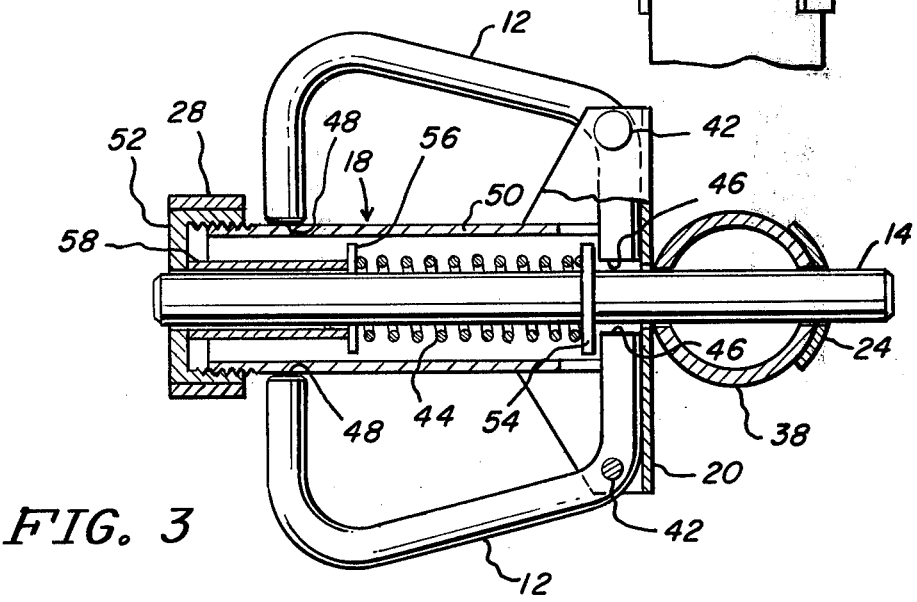
FIG. 3 is a sectional view of the latch taken along line 3—3 of FIG. 2.

FIG. 3 is a sectional view of latch 10 taken along line 3-3 of FIG. 2, illustrating in particular the detailed construction of casing 18, and bias means carried therein in the form of a spring 44. Spring 44 for the particular illustrated embodiment serves a dual function; namely, a first function of holding handles 12 in the closed position shown and a second function of holding bolt 14 in an engagement position. Normally the handle first ends 46 are held in position to operate bolt 14 from a normal engagement position to a position of disengagement and the handle second ends 48 are held in abutment with casing 18. Casing 18 includes a cylinder 50, and a cap 52. A strike is provided on bolt 14 in the form of a washer 54 against one side of which first handle ends 46 operate to move bolt 14, and on the other side of which rests an end of spring 44. Because spring 44 is shorter than the length of the casing rearward of handles 12, a washer 56 and spacer sleeve 58 are provided which maintain spring 44 normally in sufficient tension to hold handles 12 with their second ends normally in abutment against casing 18.

Figure 4:
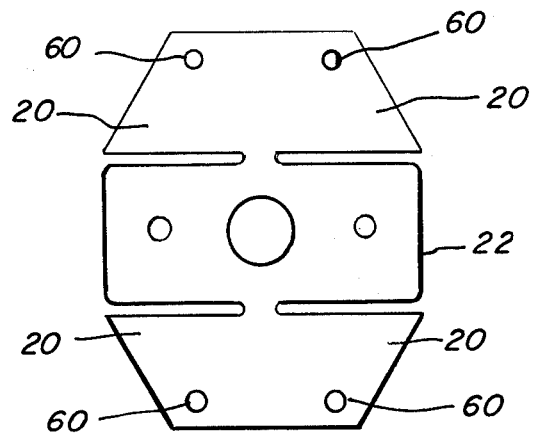
FIG. 4 is a layout view of handle mounting yokes of the latch illustrated in FIG. 2.

FIG. 4 is a layout view of attachment yokes 20 and attachment means flat plate 22. Yokes 20 and plate 22 may be formed from a piece originally in the shape of a rectangle by shearing the rectangle corners, punching or drilling the apertures, and slitting to provide end pieces which are then folded into U-shaped channels to form the yokes 20, leaving the centerpiece as a flat plate 22. Apertures 60 are provided for passage therethrough of a rivet 42.

A latch 10 suitable for use, and in fact used, on a 16 foot long, four panel, 2 inch diameter, steel pipe gate was constructed using the components as set forth in the following Table I.

TABLE I

Handle 12: ½ inch diameter mild steel rod 8½ inches long having a first section about 2⅛ inches long, second section about 3¼ inches long, and a mid-section intermediate the first and second sections about 3⅛ inches long; and having a ¼ inch diameter hole at about the juncture of the first end section and mid-section;

bolt 14: a 10 inch length of ⅝ inch diameter case hardened steel having a slightly beveled end to facilitate engagement with a catch;

catch 16: mild sheet steel, 3/16 × 3⅜ × 11¼ formed into an equilateral triangle having a 5½ inch base and the ends of which are notched to form, when joined, an opening ⅝ inch wide by 2¾ inch long (the long dimension of the opening provides a built in adjustment for sagging gates, whether it be merely from age, frost heaval, or whatever reason); two 5/16 inch holes in the base are accessible through the opening for mounting the catch by a pair of 5/16 inch by about 3 inch lag bolts or by 5/16 inch machine bolts, nuts, and lock washers;

flat plate 22: 1/16 inch mild sheet steel, 1⅝ inch by 3⅞ inches having an 11/16 inch diameter hole centered in the plate for passage therethrough of bolt 16 and a pair of 5/16 inch holes on the same spacing and alignment as the 5/16 inch holes of plate 14;

curved plate 24: ⅛ × 1⅞ × 3⅞ inch mild sheet steel, radiused to conform with a 2 inch diamter pipe; including holes the same in size and alignment as plate 22;

bolts 26 and 30: ¼ by 2¾ inch machine bolt, including nut and ¼ inch lock washer;

strap 28: ⅜ × 1 × 11½ inch mild steel having a pair of 5/16 inch diameter holes each about ¾ inch from an end of the strap;

rivet 42: 3/16 by ⅞ inch steel;

spring 44: 12 full turns over about 3½ inches of what appears to be 1/16 inch diameter stainless steel wire;

cylinder 50: 1¾ inch diameter by 6 inch long black steel pipe, threaded on one end; having a 3/16 inch drain hole and having 5/16 inch by 1⅛ inch notches for admitting handle ends 46;

cap 52: 1¾ inch black steel pipe cap having an 11/16 inch diameter hole bored in the center of the cap;

strike 54: 3/16 inch thick mild steel, by 11/16 inch I.D. and 1½ inch O.D., washer 56: 1/16 inch by 11/16 I.D. by 1¼ O.D.

sleeve 58: sheet steel 1/16 inch by 2⅜ inch by 2¼ inch long rolled into a cylinder.

Bolt 14, yoke 20, plates 22 and 24, strap 28, cylinder 50, cap 52, and strike 54 were each selected of a material suitable for welding. Strike 54 was welded to bolt 14 about four inches from one end; this end was heated until malleable and then beveled by means of a hand sledge hammer. Yokes 20 were welded to cylinder 50 as was plate 22. Strap 28 was welded to cap 52. Catch 16 was formed and welded along its seam. The holes in handles 12 were drilled by a drill press after first locating the hole position with a hand punch. Assembly of latch 10 consists of inserting bolt 14 into cylinder 50 with the beveled end of the bolt extending through the aperture in plate 22. Spring 44, washer 56 and spacer sleeve 58 are each placed over bolt 14 and cap 52 screwed on to complete the assembly. Mounting of the latch 10 handle and casing assembly to a 16 foot, 2 inch diameter pipe gate was made by drilling a 5/16 inch hole in a horizontal member 34 and a pair of 5/16 inch holes in a vertical member 38. The latch 10 catch plate 16 attachment was facilitated by drilling a pair of 5/16 inch holes through a gate post 40.

Figure 5:
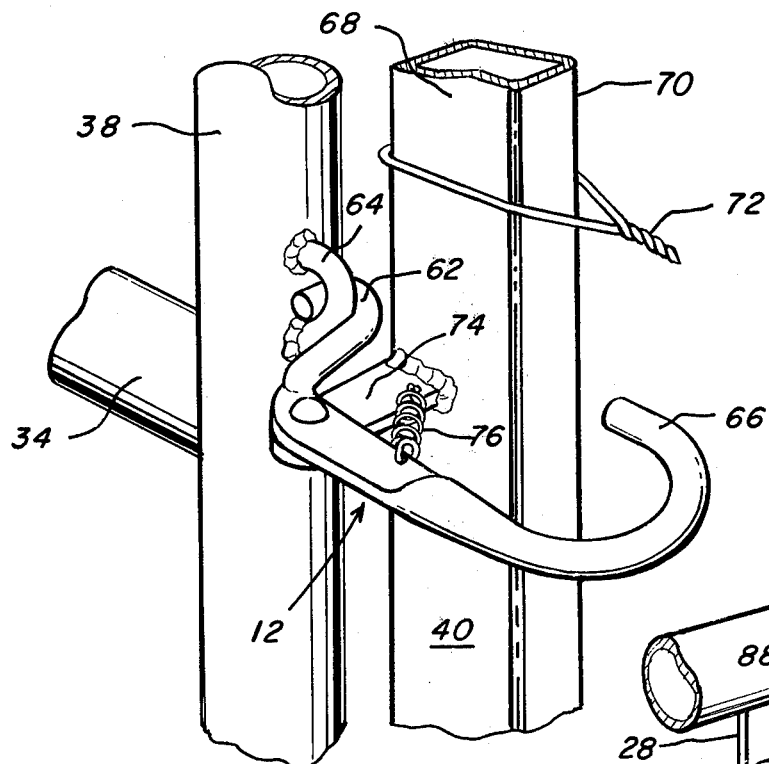
FIG. 5 is a perspective view of an alternative embodiment of a gate latch embodying the broad principles of the present invention.

FIG. 5 is an alternative embodiment of a latch 10. A handle 12 comprises a single continuous rod having a hook shaped end 62 which is a moveable member for engaging an eye 64. The second end 66 of handle 12 is configured to be normally in a recessed position extending from the front side 68 of gate post 40 and curling around behind post 40 to the vicinity of the post 40 back side 70. Access to the back side 70 by animals is prevented by related structure such as barbed wire 72. Handle 12 is mounted to gate post 40 by mounting plate 74, and is normally held in a position having end 66 recessed as described by bias means in the form of spring 76. Spring 76 is chosen according to the type of animal contained within the enclosure. Because application of a push of sufficient force to the gate operating through catch 64 would also operate handle 12, the embodiment of FIG. 5 is intended for applications such as baby pig farrowing pens or lamb pens in which the farm animals are insufficiently large to individually or in combination apply a sufficient pushing force to open the gate, or, alternatively, for sliding rather than swinging gates.

Figure 6:
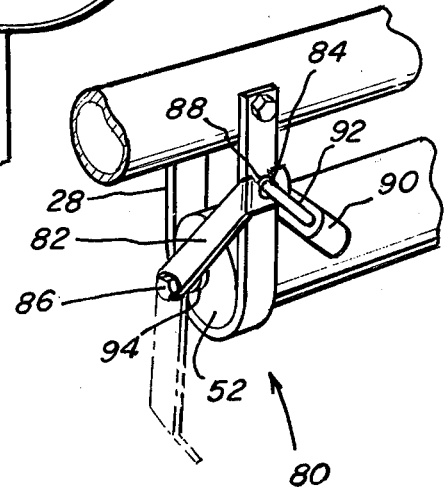
FIG. 6 is a fragmentary view of an embodiment of a gate latch according to FIG. 1 incorporating a lock mechanism.

FIG. 6 illustrates an embodiment of a latch according to FIG. 1 which incorporates a lock mechanism shown generally as 80. The lock mechanism 80 comprises a strap 82 carrying an aperture 84 therein, bolt or rivet 86 for pivotally securing strap 82 to cap 52, an aperture 88 in attachment means 28, and a padlock 90. When locked the finger 92 of padlock 90 passes through apertures 84 and 88 to position strap 82 over the end 94 of bolt 14 to prevent rearward (withdrawal) movement of bolt 14. When unlocked, strap 82 pivots free and clear of end 94 as shown in phantom.

Having thus described how to make and use the invention by means of the foregoing illustrative embodiments, the former of which is the best mode contemplated by the inventor for carrying out his invention, variations and modifications to the invention as described and illustrated herein shall be obvious to a person skilled in the art. All such variations and modifications are deemed within the scope of the invention, the true scope of which is defined by the following claims.

What is claimed is:

1. In combination, a farm gate latch comprising:
   A. a cylindrical casing;
   B. a bolt for engaging a catch;
   C. means for mounting said bolt for limited slidable movement within said casing and for positioning said bolt within said casing with an end extending from said casing sufficiently far to engage a catch;
   D. at least one pivotally mountable, planar, elongate, handle adapted for moving said bolt into disengagement from said catch, which handle is mounted for pivotal rotation substantially entirely along a plane, and has a first end and a second end, which first end is adapted to operate said bolt to disengage from said catch, which handle is configured for application of a grip-like force between said first and second ends, and which second end is adapted for abutment or recess with other structure of the gate latch or with structure of a gate to which the catch is attached whereby a force cannot be applied to said second end when the gate latch is closed to frustrate operation of the latch by farm animals such as cattle and horses; and, E. an attachment yoke adapted for pivotally mounting a said handle comprising a unitary sheet including at least a pair of opposing sections forming a generally U-shaped channel member and which sections provide a pivot bearing for a said handle and which sheet includes a surface adapted for stationary mounting of said yoke to either a gate or said casing to provide a fulcrum against which a said handle acts as it is pivoted.

2. A farm gate latch comprising, in combination:

first moveable means for engaging a catch, which first moveable means is moveable between positions of engagement with and disengagement from said catch;

second means including a handle responsive to a grasp-like force to move said first moveable means from a position of engagement to a position of disengagement; and, third means for mounting said first moveable means and said second means to a gate comprising an attachment yoke adapted for pivotally mounting a said handle comprising a unitary sheet including at least a pair of opposing sections forming a generally U-shaped channel member and which sections provide a pivot bearing for a said handle and which sheet includes a surface adapted for stationary mounting of said yoke to either a gate or said casing to provide a fulcrum against which a said handle acts as it is pivoted.

3. In a farm gate latch having a moveable member for melting engagement with a catch, the improvement comprising:

an elongate handle having a first end and a second end, which handle lies substantially in a single plane and is pivotally mounted for rotation substantially entirely along said plane, which first end is adapted to operate said member to disengage from said catch in response to a grasp-like force applied between said first and second ends, and which second end is adapted for abutment with other structure of the gate latch or for abutment with or recess with respect to structure of a gate to which the latch is attached whereby a force cannot be applied to said second end when the gate latch is closed to frustrate operation of the latch by farm animals such as cattle and horses; and, an attachment yoke adapted for pivotally mounting a said handle comprising a unitary sheet including at least a pair of opposing sections forming a generally U-shaped channel member and which sections provide a pivot bearing for a said handle and which sheet includes a surface adapted for stationary mounting of said yoke to either a gate or said casing to provide a fulcrum against which a said handle acts as it is pivoted.

4. In a farm gate latch according to claim 3 wherein said moveable member comprises a bolt mounted for slidable movement between positions of engagement and disengagement with said catch, the improvement wherein:

said handle first end engages said bolt to slide said bolt to said position of disengagement as said handle is pivoted.

5. In a farm gate latch according to claim 4, the improvement further comprising bias means for normally resiliently holding said handle second end in abutment or recess.

6. In a farm gate latch according to claim 5, the improvement wherein said bias means comprises:

a spring for normally holding said bolt in said engagement position; and, a strike for interactingly coupling said bolt and said handle first end for transmitting to the handle the holding force applied by said spring to the bolt to normally hold the handle in a position with said handle second end in said abutment or recess.

7. In a farm gate latch according to claim 6, wherein said gate latch includes a casing having at least one apertured end, wherein said bolt is housed within said casing, the improvement wherein:

said spring is fixed to said casing and to said bolt to normally extend an end of the bolt through said apertured end; and said strike comprises a washer fixed to said bolt and against which said handle first end operates to impart movement of the handle end to the bolt and, conversely, to impart a force applied to the bolt by said spring to said handle.

8. In a farm gate latch according to claim 7, the improvement wherein said handle includes an attachment yoke secured to said casing and a pivot pin interconnecting said handle and said yoke.

9. In a farm gate latch according to claim 8, the improvement wherein said generally U-shaped channel member attached at one channel end to said casing, and wherein said handle includes a length of rod having a pair of ends forming said first end and said second end, which rod is housed within said channel member along a portion of its length between said first end and a point at which said handle is pivotally connected to said channel member.

10. In a farm gate latch according to claim 9, the improvement wherein said spring is a coil spring.

11. In a farm gate latch according to claim 10, the improvement wherein said handle second end normally abuts said casing.

12. In a farm gate latch according to claim 3, the improvement comprising a pair of said handles, one of which handles when said latch is mounted to a gate or gate post is operable from one side of a said gate and the other of which handles is operable from the other side of a said gate.

13. In a farm gate latch according to claim 12, the improvement wherein each said handle is operative independent of the other handle.

14. In a farm gate latch according to claim 12, the improvement further comprising: a cylindrical casing including means for mounting said moveable member for limited slidable movement within said casing and for positioning said moveable member with an end extending from said casing sufficiently far to engage a catch; and, means for attaching said casing to a gate.

15. In a farm gate latch for a pipe gate according to claim 14, the improvement wherein said yoke comprises a pair of said channel members on opposite sides of said casing and joined together by an elongate center section and including means for attachment of said center section to a vertical pipe of a said gate, and said gate latch further comprises first means for attachment to a vertical pipe of a gate, second means for attachment to a horizontal pipe of a gate, and wherein said casing is a cylinder, said moveable member is a bolt housed within said casing, said first attachment means comprises a curved plate adapted to sandwich a vertical pipe of said gate member in cooperation with said center section and both of which curved plate and said center section each includes an aperture for passage therethrough of said bolt; and said second attachment means comprises an elongate strap wrapped in its mid region around said casing and having its ends adapted for accepting interconnecting means such as a bolt and having ends of a length suitable for attachment to a horizontal pipe of said gate.

16. In a farm gate latch according to claim 4, the improvement wherein said catch is an open cylinder having a triangular cross-section and an opening along the apex of said cylinder for accepting said moveable member.

17. In a farm gate latch according to claim 7, the improvement further comprising lock means for restricting movement of said bolt to prevent withdrawal of the bolt from a said catch to lock the latch.

18. In a farm gate latch according to claim 17, the improvement wherein said casing is a cylinder having an aperture at each end for slidable passage therethrough of said bolt, which bolt has a forward end extending from said casing for engagement with a said catch and a rearward end which extends through an aperture of said casing, and wherein said lock comprises a strap moveable between positions in contact with and out of contact with the rearward end of said bolt and means for securing said strap in said position in contact with the rearward end of said bolt.

19. In a farm gate latch according to claim 18, wherein said casing includes a cap having an aperture through which said bolt rearward end extends and which cap carries thereon an elongate strap including an aperture therein and wherein said lock strap is pivotally secured to said cap and includes an aperture positioned for alignment with the aperture in said elongate strap when said lock strap is in contact with the rearward end of said bbolt whereby a padlock may be inserted through said aligned apertures to lock the latch.

* * * * *